United States Patent [19]

Miller

[11] Patent Number: 4,796,464
[45] Date of Patent: Jan. 10, 1989

[54] ELECTRONIC OIL PRESSURE SENSOR DEVICE

[75] Inventor: Paul D. Miller, Huntsville, Ala.

[73] Assignee: Chrysler Motors Corporation, Highland Park, Mich.

[21] Appl. No.: 114,331

[22] Filed: Oct. 29, 1987

[51] Int. Cl.[4] .......................................... G01M 15/00
[52] U.S. Cl. ....................................... 73/115; 439/353
[58] Field of Search ................ 73/115, 721; 310/338; 439/353

[56] References Cited

U.S. PATENT DOCUMENTS

| | | | |
|---|---|---|---|
| 2,183,651 | 12/1939 | Langston et al. | 439/353 |
| 4,163,964 | 10/1979 | De Filippis | 338/215 |
| 4,320,664 | 8/1982 | Rehn et al. | 73/708 |
| 4,513,623 | 4/1985 | Kurtz et al. | 73/721 |
| 4,567,395 | 1/1986 | Pundarika | 310/338 |
| 4,570,097 | 2/1986 | Shukla et al. | 310/338 |
| 4,590,400 | 5/1986 | Shukla et al. | 310/338 |
| 4,616,114 | 10/1986 | Strasser | 200/83 |
| 4,620,438 | 11/1986 | Howng | 73/35 |
| 4,633,579 | 1/1987 | Strasser | 29/622 |
| 4,645,965 | 2/1987 | Paganelli | 310/338 |

Primary Examiner—Jerry W. Myracle
Attorney, Agent, or Firm—Mark P. Calcaterra

[57] ABSTRACT

An electronic oil pressure unit housing combines electronic signal conditioning circuitry to a series pressure sensor in a manner which provides interface to the oil pressure port of an automotive engine and connection to a wiring harness via an automotive waterproof connector. The package is comprised of a minimum number of components, is designed for Z-axis assembly and can be installed with a deep well socket.

7 Claims, 2 Drawing Sheets

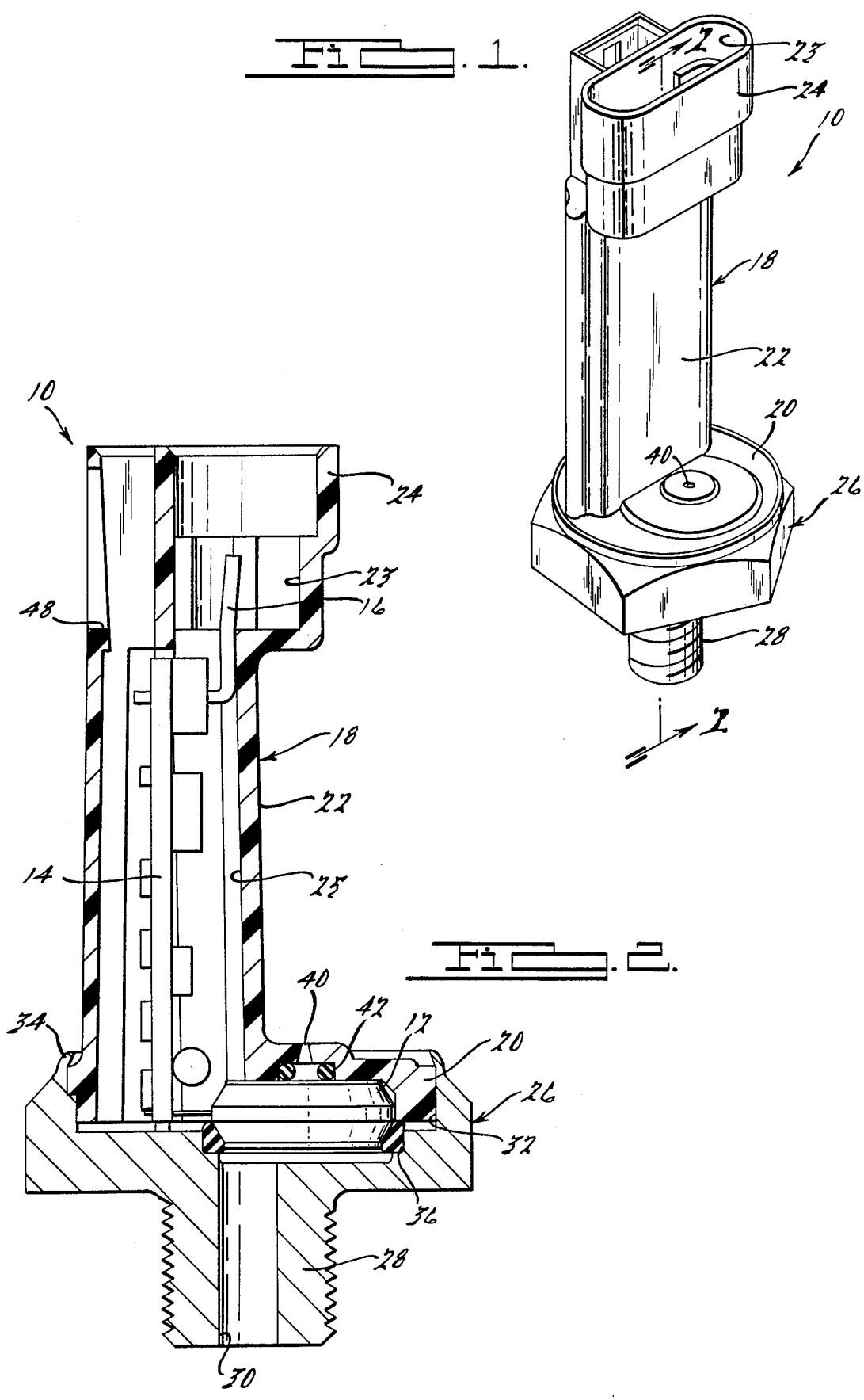

ELECTRONIC OIL PRESSURE SENSOR DEVICE

BACKGROUND OF THE INVENTION

1. Field of the Invention

The subject invention relates to the packaging of electronic sensing circuitry for use in automotive engine applications.

2. Prior Art

The typical automotive oil pressure sensor is a mechanically intensive device with many moving parts. An example of such a device includes a housing encompassing circuitry within the housing. The housing includes a threaded portion at one end for threadably engaging an engine and a cavity portion at the other end for receiving a wiring harness.

The problem with such devices is that the transducer comprises many moving parts and sliding contacts which are subject to vibration and corrosion. Such transducers displace a large volume of air, making waterproofing difficult. These devices are also lengthy and bulky. Further, many of these devices cannot be installed in an engine by use of a deep well socket. In addition, the typical electronic pressure sensor is not satisfactory for the rugged automotive under-hood environment.

Others have attempted various solutions to the above problems. One example is U.S. Pat. No. 4,590,400 to Shukla et al. which discloses a piezoelectric cylinder pressure transmitter.

U.S. Pat. No. 4,163,964 to De Filippis discloses a pneumatic or hydraulic pressure sensors with several thresholds of response.

U.S. Pat. No. 4,320,664 to Rehn et al. discloses a thermally compensated silicon pressure sensor.

U.S. Pat. No. 4,567,395 to Pundarika discloses a piezoelectric pressure transmitter for an internal combustion engine.

U.S. Pat. No. 4,570,097 to Shukla et al. discloses electrical connections for a piezoelectric pressure transmitter for an internal combustion engine.

U.S. Pat. No. 4,620,438 to Howng discloses a cylinder pressure transmitter for an internal combustion engine.

U.S. Pat. No. 4,616,114 to Strasser discloses a pressure responsive switch having little or no differential between actuation release pressure levels.

U.S. Pat. No. 4,633,579 to Strasser discloses a method for making a pressure responsive switch.

U.S. Pat. No. 4,645,965 to Paganelli discloses a cylinder pressure transmitter for an internal combustion engine.

SUMMARY OF THE INVENTION

An electronic fluid pressure sensing device for determining the pressure of a fluid in an engine includes sensing means for sensing the pressure of a fluid. A circuit means determines the pressure of the fluid. A housing means forms a housing about the circuit means and sensing means. An attachment means attaches the housing means to the engine. A locating means locates the housing means relative to the attachment means.

Accordingly, the subject invention is designed for high-volume assembly, has no moving parts and is ruggedized for automotive use. All of the parts are nested to provide the shortest possible design and assuring that the assembly can be installed on an engine by use of a deep well socket. Further, the subject invention combines and protects the electronic pressure sensing and signal conditioning circuitry in a waterproof package which is threadably connected to the the engine block and engageable with a wiring harness of an automobile.

DESCRIPTION OF THE DRAWINGS

Other objects, features and advantages of the present invention will become more fully apparent from the following detailed description of the preferred embodiment, the appended claims and in the accompanying drawings in which:

FIG. 1 is a perspective view of the subject invention;

FIG. 2 is a sectional view taken along lines 2—2 of FIG. 1;

DETAILED DESCRIPTION OF THE PREFERRED EMBODIMENT

Figure 4:
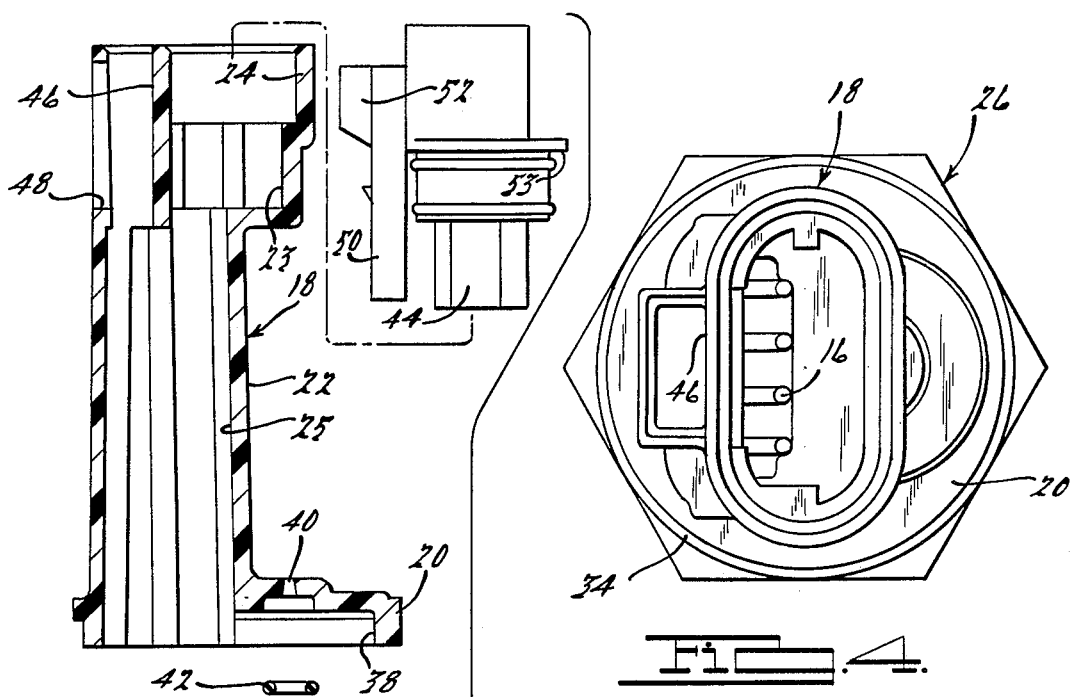
FIG. 4 is a plan view of FIG. 1.

This application is related to another commonly assigned, co-pending application, U.S. Ser. No. 07/114,332 by Burcham, entitled "Electronic Oil Pressure Sensor Circuit", which was filed on the same day as the subject case and which has claims directed solely to circuitry that would be packaged in the device described and claimed herein.

An electronic fluid pressure sensing device for determining the pressure of a fluid such as oil in an engine (not shown) is generally shown at 10 in FIGS. 1 and 2. The device 10 comprises sensing means for sensing the pressure of the fluid and circuit means for determining the pressure of the fluid. The sensing means comprises an annular sensor 12 which is a piezoresistive implant on a silicon die. The circuit means comprises a circuit board 14 containing electronic components and having at least one, preferably a plurality of, projections 16 extending outwardly at one end and the sensor 12 connected to the other end, as illustrated in FIG. 3.

The device 10 includes housing means forming a housing, generally indicated at 18, about the circuit board 14 and sensor 12. The housing means comprises a housing 18 made of a polymeric material. As illustrated in FIGS. 2 and 3, the housing 18 comprises an annular base portion 20, a tubular portion 22 extending outwardly and offset from the base portion 20 and a female receptacle portion 24 at the other end of the tubular portion 22.

Figure 3:
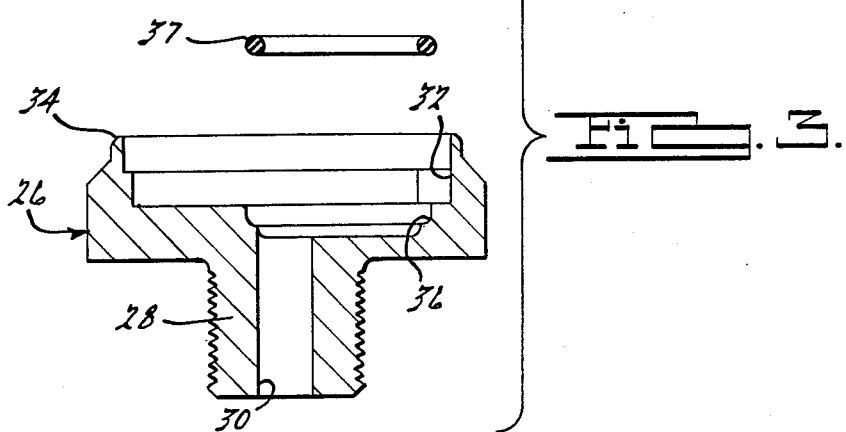
FIG. 3 is an exploded view of FIG. 2.

As illustrated in FIGS. 2 and 3, the sensor 12 is mounted as a standing component on the circuit board 14. The circuit board 14 may be wave soldered during the regular board assembly and is offset from the centerline of the housing 18 so that the circuit board 14 will fit in the smallest possible diameter. The projections 16 are wave soldered to the circuit board 14. The 95 degree bend on the projection 16 is not parallel to the circuit board 14. This provides spring retention when the circuit board 14 is slid into its slot retaining the circuit board 14 and provide for Z-axis assembly. The projections 16 slide along an alignment retention or circuit cavity 25 during assembly. This cavity 25 brings the projections 16 into alignment with the connector cavity 23 of the female receptacle portion 24.

Figure 5:
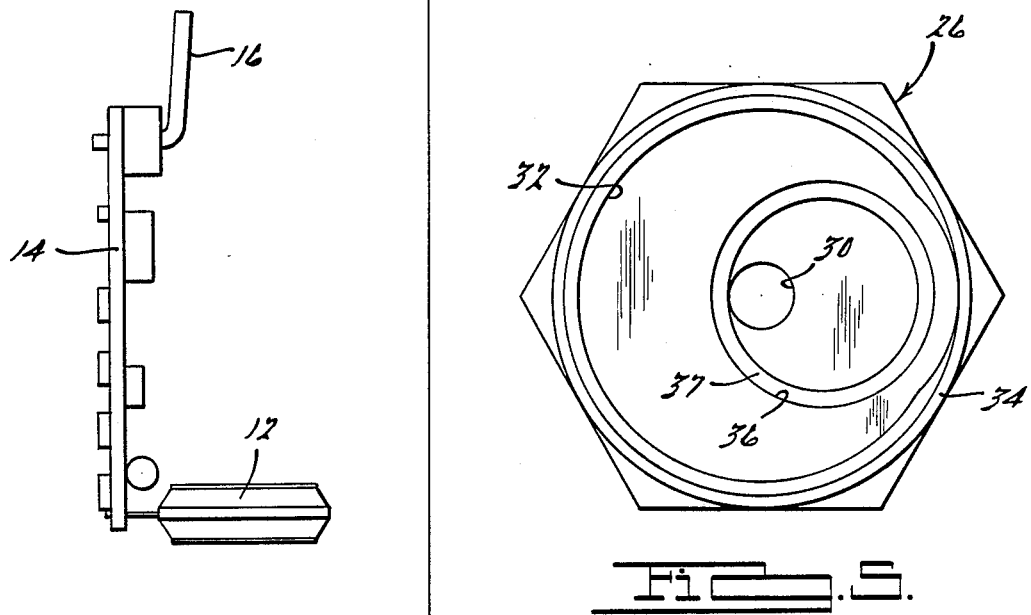
FIG. 5 is a plan view of the base member of FIG. 1.

The device 10 also includes attachment means for attaching the housing 18 to the engine. The attachment means comprises a metal base member, generally indicated at 26, having a threaded portion 28 such as a tapered pipe thread extending outwardly from the base member 26 for threadably engaging the engine, as illustrated in FIGS. 2 and 3. The base member 26 includes aperture means forming an aperture 30 in the base member 26 to allow fluid to enter and exit the base member 26. As illustrated in FIGS. 4 and 5, the base member 26 is hexagonal in shape and includes a cavity 32. The aperture 30 communicates with the cavity 32. The base member 26 also includes an integral crimp ring or annular flange 34 extending outwardly from the base member 26 and adapted to be crimped or rolled down to partially cover the base portion 20 of the housing 18. The flange 34 is rolled down and acts as a securing means for securing or retaining the housing 18 to the base member 26 and to seal the inner chambers to prevent potting material from leaking out and water intrusion into the device 10.

The device 10 further includes locating means for locating the housing 18 relative to the base member 26. As illustrated in FIGS. 3 and 5, the locating means comprises a recess 36 within the cavity 32 for allowing the sensor 12 to be partially disposed in the recess 36. The recess 36 is offset from the center line of the aperture 30 of the threaded portion 28. The device 10 also includes sealing means comprising an O-ring 37 disposed between the recess 36 and the sensor 12 to prevent fluid from flowing past the sensor 12.

As illustrated in FIG. 3, the base portion 20 of the housing 18 includes a cavity portion 38. The sensor 12 is partially disposed in the recess 36 and cavity portion 38, as illustrated in FIG. 2. The base portion 20 also includes an aperture 40 communicating with the cavity portion 38 to act as a vent hole. A sealing means comprising an O-ring 42 is disposed between the sensor 12 and aperture 40. The O-ring 42 also acts as a spring to press the sensor 12 into O-ring 37 in the base member 26 to compensate for out-of-tolerance parts.

The device 10 further includes connector means for detachably connecting the circuit board 14 to a control source such as a wiring harness (not shown). As illustrated in FIG. 3, the connector means comprises a male member 44 connected to the control source (not shown) and removably disposed in the female receptacle portion 24 and engaging the projections 16 on the circuit board 14. The device 10 includes locking means for detachably securing the connector means to the housing 18. A second cavity portion 46 having a slot 48 is connected to the tubular portion 22. The locking means comprises a spring lock or flexible projection 50 connected to the male member 44 to engage the slot 48 in the tubular portion 22. The flexible projection 50 includes a button 52 for depressingly engaging and disengaging the flexible projection 50 with the slot 48. A flange 53 on the male member 44 acts as stop means for allowing the male member 44 to be inserted to a predetermined distance within the female receptacle portion 24.

As illustrated in FIG. 2, the cavity portion 46 is used as a potting port via a direct connection to the circuit cavity 25. The slot 48 is extended to act as a potting overflow to set the maximum level of potting just above the bottom of the connector cavity 23 of the female receptacle portion 24 to seal it from the second cavity portion 46. The bottom of the connector cavity 23 is open to the circuit cavity 25 to provide a gas vent during the potting process to facilitate smooth flow of potting through the notches on the bottom of the circuit board 14. The O-ring 42 seals the vent hole or aperture 40 above the sensor 12 to prevent the entry of potting compound in the area. The circuit cavity 25 for the circuit board 14 has adequate clearance for the circuit board components.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An electronic fluid pressure sensing device for determining the pressure of a fluid in an engine comprising:
   sensor means for sensing the pressure of a fluid;
   circuit means for determining the pressure of the fluid;
   housing means forming a housing about said circuit means and said sensing means;
   attachment means for attaching said housing means to the engine;
   locating means for locating said housing means relative to said attachment means;
   said attachment means comprising a base member having a threaded projection extending outwardly from said base member for threadably engaging the engine;
   aperture means forming an aperture in said base member to allow fluid to enter and exit said base;
   said base member including a cavity, said aperture communicating with and formed concentric to said cavity;
   said locating means comprising a recess formed eccentrically within said cavity for allowing said sensing means to be disposed in said recess.

2. A device as set forth in claim 1 further characterized by said housing means comprising a housing having an annular base portion, a tubular portion extending outwardly and offset from said base portion and a female receptacle portion at one end of said tubular portion.

3. A device as set forth in claim 2 further characterized by said housing means including aperture means forming an aperture opposite said recess to act as a vent.

4. An electronic fluid pressure sensing device for determining the pressure of a fluid in an engine comprising:
   sensor means for sensing the pressure of a fluid;
   circuit means for determining the pressure of the fluid;
   housing means forming a housing about said circuit means and said sensing means;
   attachment means for attaching said housing means to the engine;
   said attachment means comprising a base member having a threaded projection extending outwardly from said base member for threadably engaging the engine;
   aperture means forming an aperture in said base member to allow fluid to enter and exit said base;
   said circuit means including a circuit board having at least one projection extending outwardly at one end, said sensor being connected at the other end;
   said base member including a cavity, said aperture communicating with said cavity;

including locating means for locating said housing means relative to said base member;

said locating means comprising a recess within said cavity for allowing said sensor to be disposed in said recess;

sealing means disposed between said recess and said sensor to prevent fluid from flowing past said sensor;

said housing means comprising a housing having an annular base portion and a tubular portion extending outwardly from said base portion and having a female receptacle portion at one end of said tubular portion;

said base portion including aperture means forming an aperture to act as a vent;

connector means for detachably connecting said circuit means to a control source;

said connector means comprising a male member connected to the control source and being removably disposed in said female receptacle member;

locking means for detachably securing said connector means to said housing means;

said locking means comprising a flexible projection connected to said male member to engage a slot in said female receptacle portion;

stop means for allowing said male member to be inserted a predetermined distance within said female receptacle portion;

said housing means being made of a polymeric material;

said base member being made of metal;

said base member including securing means for securing said housing to said base member; and said securing means comprising an annular flange extending outwardly from said base member and adapted to be crimped to partially cover said base portion.

5. An electronic fluid pressure sensing device for determining the pressure of a fluid in an engine comprising:

sensing means for sensing the pressure of a fluid;

circuit means for determining the pressure of the fluid;

housing means forming a housing about said circuit means and said sensing means;

attachment means for attaching said housing means to the engine; and locating means for locating said housing means relative to said attachment means;

said attachment comprising a base having a threaded projection extending outwardly from said base member for threadably engaging the engine;

aperture means forming an aperture in said base member to allow fluid to enter and exit said base member;

said base member including a cavity, said aperture communicating with said cavity;

said locating means comprising a recess within said cavity for allowing said sensing means to be disposed in said recess;

sealing means disposed between said recess and said sensing means to prevent fluid from flowing past said sensing means; and said housing means including aperture means forming an aperture opposite said recess to act as a vent.

6. An electronic fluid pressure sensing device for determining the pressure of a fluid in an engine comprising:

sensing means for sensing the pressure of a fluid;

circuit means for determining the pressure of the fluid;

housing means forming a housing about said circuit means and said sensing means;

attachment means for attaching said housing means to the engine;

locating means for locating said housing means relative to said attachment means;

said attachment means comprising a base having a threaded projection extending outwardly from said base member for threadably engaging the engine;

said housing means comprising a housing having an annular base portion, a tubular portion extending outwardly from said base portion and a female receptacle portion at one end of said tubular portion;

said base member including securing means for securing said housing to said base member; and said securing means comprising an annular flange extending outwardly from said base member adapted to be crimped to partially cover said base portion.

7. An electronic fluid pressure sensing device for determining the pressure of a fluid in an engine comprising:

sensing means for sensing the pressure of a fluid;

circuit means for determining the pressure of the fluid;

housing means forming a housing about said circuit means and said sensing means;

attachment means for attaching said housing means to the engine;

locating means for locating said housing means relative to said attachments;

said attachment means comprising a base having a threaded projection extending outwardly from said base member for threadably engaging the engine;

said housing means comprising a housing having an annular base portion, a tubular portion extending outwardly from said base portion and a female receptacle portion at one end of said tubular portion;

said circuit means comprising a circuit board having at least one projection extending outwardly at one end and said sensing means connected to the other end;

connector means for detachably connecting said circuit means to a control source;

said connector means comprising a male member connected to a control source and removably disposed in said female receptacle portion and engaging said projections;

locking means for detachably securing said connector means to said housing means;

a second cavity portion in said tubular portion and having a slot;

said locking means comprising a flexible projection connected to said male member to engage said slot in said tubular portion;

a button for depressingly engaging and disengaging said flexible projection with said slot; and stop means for allowing said male member to be inserted a predetermined distance within said female receptacle portion.

* * * * *